(12) United States Patent
Witte et al.

(10) Patent No.: US 7,038,160 B2
(45) Date of Patent: May 2, 2006

(54) METHOD FOR PRODUCING PERMANENT INTEGRAL CONNECTIONS OF OXIDE-DISPERSED (ODS) METALLIC MATERIALS OR COMPONENTS OF OXIDE-DISPERSED (ODS) METALLIC MATERIALS BY WELDING

(75) Inventors: Jorq Witte, Pfungstadt (DE); Manfred Borens, Mainz (DE); Franz-Peter Eckes, Bubenheim (DE); Stefan Bauer, Huffelsheim (DE); Helmut Schoppe, Engelstadt (DE); Andreas Stolzenberg, Guntersblum (DE); Stefan Freidrich Melchior, Gustavsburg (DE); Robert Ruehl, Mainz (DE)

(73) Assignee: Schott Glas, (DE)

( * ) Notice: Subject to any disclaimer, the term of this patent is extended or adjusted under 35 U.S.C. 154(b) by 9 days.

(21) Appl. No.: 10/643,027

(22) Filed: Aug. 18, 2003

(65) Prior Publication Data
US 2004/0035855 A1 Feb. 26, 2004

(30) Foreign Application Priority Data
Aug. 17, 2002 (DE) ................ 102 37 763

(51) Int. Cl.
*B23K 11/00* (2006.01)
*B23K 20/00* (2006.01)
(52) U.S. Cl. .............. 219/78.02; 228/193; 228/194
(58) Field of Classification Search ........... 219/78.02, 219/86.22, 91.22, 91.23; 228/193, 194, 155, 228/1.1, 110.1; 29/445
See application file for complete search history.

(56) References Cited

U.S. PATENT DOCUMENTS

| | | | | |
|---|---|---|---|---|
| 3,095,500 A | * | 6/1963 | Jost ...................... | 219/78.02 |
| 3,644,698 A | * | 2/1972 | Metcalfe et al. ............. | 219/83 |
| 3,758,741 A | * | 9/1973 | Holko et al. ............. | 219/78.02 |
| 4,689,465 A | * | 8/1987 | Pal ......................... | 219/117.1 |
| 5,009,359 A | | 4/1991 | Stover et al. .............. | 228/175 |
| 5,094,699 A | | 3/1992 | Feichtinger et al. ....... | 148/12.1 |
| 6,037,559 A | * | 3/2000 | Okabe et al. ............ | 219/91.23 |

FOREIGN PATENT DOCUMENTS

| | | |
|---|---|---|
| DE | 39 04 776 | 8/1990 |
| DE | 39 15 702 | 11/1990 |

OTHER PUBLICATIONS

Klaus-Jürgen Matthes et al., "Schweißtechnik: Schweißen metallischer Konstruktionswerkstoffe," Fachbuchverlag Leipzig, pp. 420-425, German text only.

* cited by examiner

*Primary Examiner*—Kevin P. Kerns
(74) *Attorney, Agent, or Firm*—Ostrolenk, Faber, Gerb & Soffen, LLP

(57) ABSTRACT

A method for producing permanent integral connections of oxide-dispersed metallic materials by welding. The materials or components to be connected are overlapped to form an overlapping region in a joining region of the overlapping region. The materials or components are heated below the melting temperatures of the materials and are welded to at least partially form a diffusion bond by a welding method. A noble metal foil may be between the components to be connected. The diffusion bond is heated subsequently to a temperature below the melting temperature of the materials or components and the bond is mechanically recompacted by hammering.

42 Claims, 6 Drawing Sheets

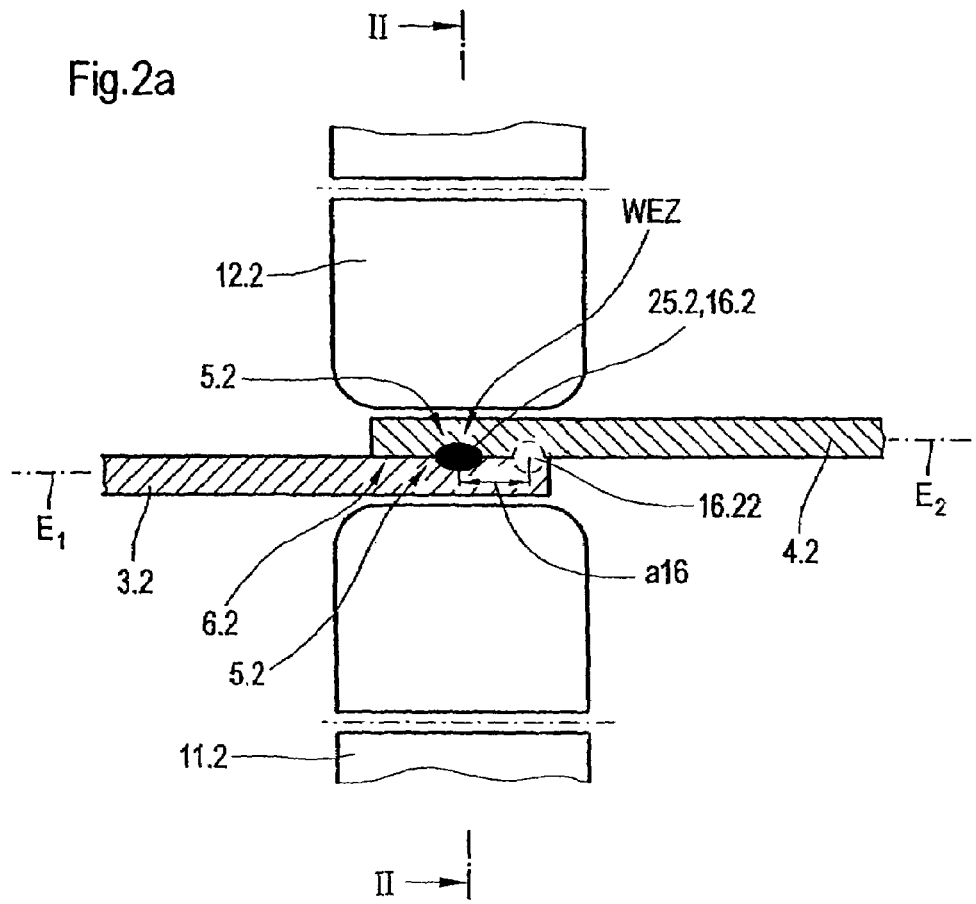
Fig.2a
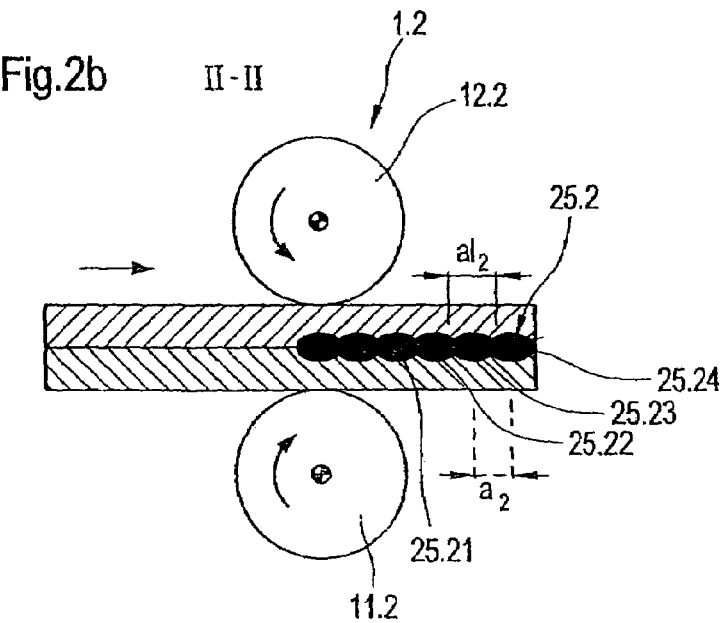
Fig.2b  II-II

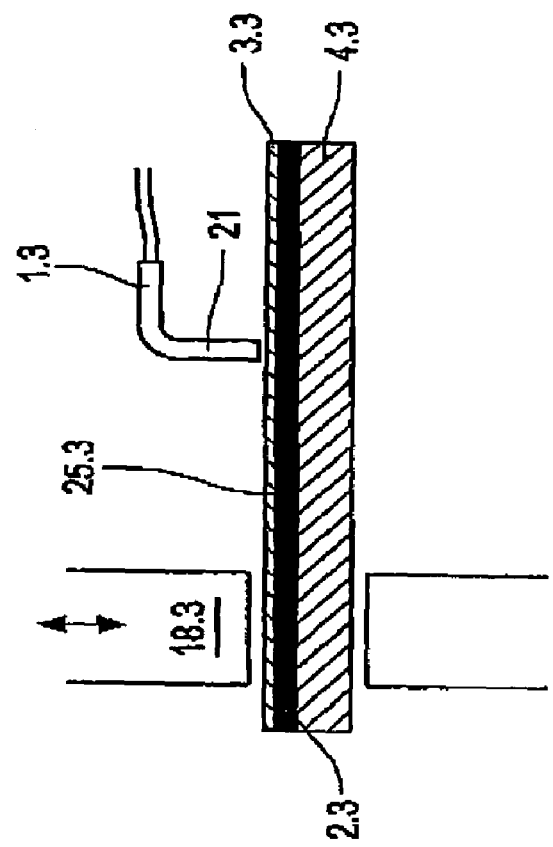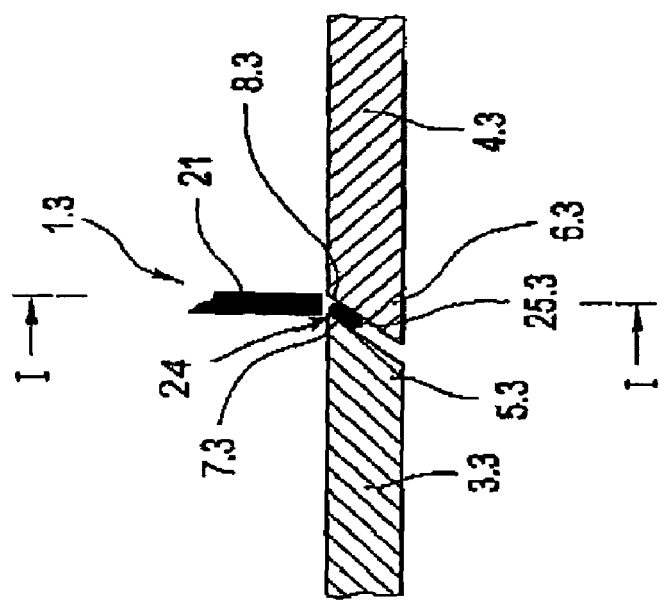

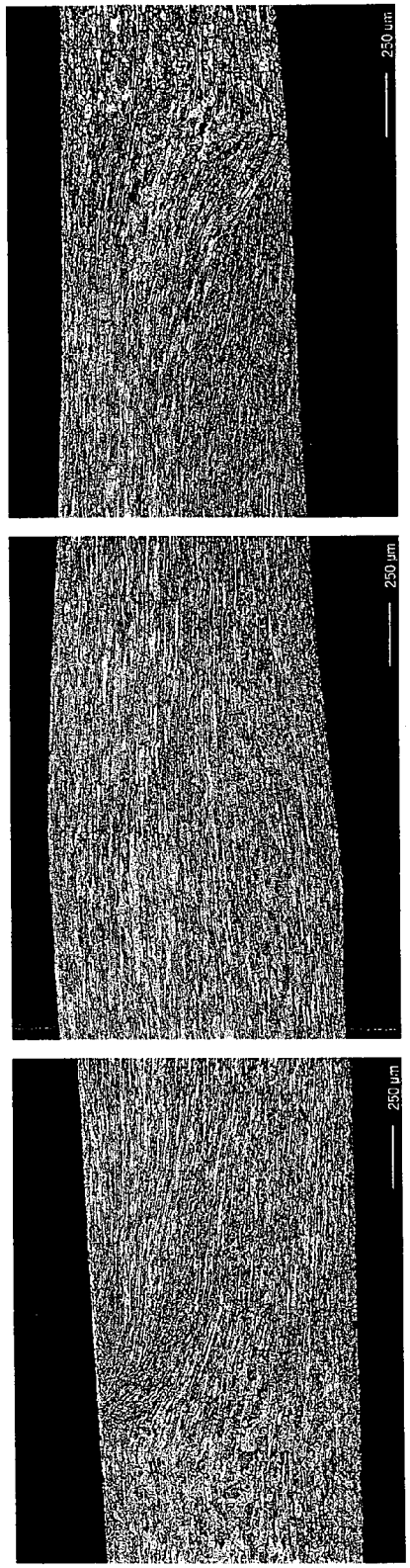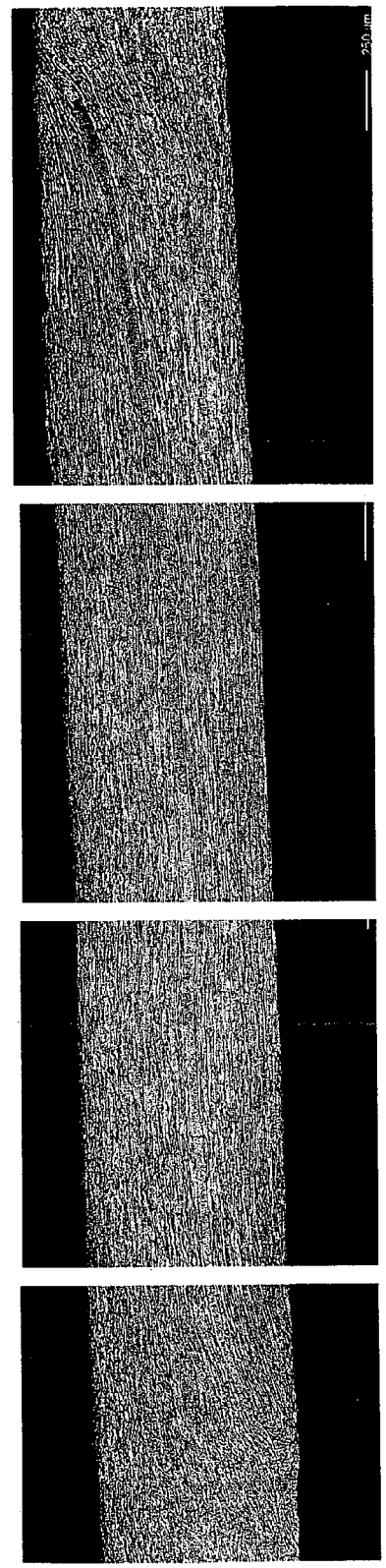
Fig. 4a                           Fig. 4b

METHOD FOR PRODUCING PERMANENT INTEGRAL CONNECTIONS OF OXIDE-DISPERSED (ODS) METALLIC MATERIALS OR COMPONENTS OF OXIDE-DISPERSED (ODS) METALLIC MATERIALS BY WELDING

BACKGROUND OF THE INVENTION

The invention relates to a method for producing permanent integral connections of oxide-dispersed (ODS) metallic materials, in particular for producing integral connections of components of oxide-dispersion-strengthened noble-metal alloys, specifically with successive heating steps and mechanically shaping the bond at the connection.

It is known in the production of special types of glass to use structural elements encased in noble metal, for example stirrers, channels, feeder heads, for homogenizing or transporting the glass melt. The noble-metal alloys used are usually platinum base alloys with alloying additions of rhodium, iridium or gold. If very high component strengths are required on account of mechanical and/or thermal loads imposed by the glass melt, oxide-dispersion-strengthened platinum base alloys are increasingly used, since they are characterized by a greater thermal, mechanical and chemical load-bearing capacity than standard alloys. Oxide-dispersed alloys, referred to hereafter as ODS alloys, are distinguished by a very homogeneous microstructure. ODS noble-metal alloys based on PtRh10, PtAu5 or pure Pt, which are used for producing components in the glass industry, additionally have a much lower tendency for coarse grains to form at high temperatures, allowing the mechanical properties to be positively influenced. Apart from the choice of suitable material, however, the production, in particular shaping, of the structural elements encased in noble metal also plays an important part in determining the strength. They are generally produced from semifinished products, i.e. metal sheets or sheet-metal elements are joined together to give the required geometry. This connection is generally produced by fusion welding of the individual semifinished products. In this case, the joints of the components to be connected to one another and, if appropriate, additional material of the same type are transformed into the molten state by heat being supplied and they are fused together. The heat of fusion may in this case be generated by an electric arc or an ignited gas-oxygen mixture. If, however, structural elements joined in such away are exposed to very high temperatures, for example above 1200° C., the welded seam often forms the weak point of the overall material bond. Inhomogeneities in the welded seam and changes in the microstructure in the heat-affected zone have been determined as the cause. Particularly longitudinal welded seams in cylindrical components, such as pipes for example, are particularly at risk because of the stresses acting that are approximately twice as high as in the case of circumferential welded seams, with the result that the seams often fail and tear apart. When known welding methods are used, such as for example tungsten-inert gas welding (TIG welding), plasma welding, laser or autogenous welding, melting of the alloy is brought about. While only very small losses in strength in the welded seam are to be observed during the melting of classic substitutional solid solution alloys as a result of recrystallization during use above 1200° C., the melting when oxide-dispersion-strengthened alloys are welded leads to coagulation and floating of a large part of the disperoids, typically of $ZrO_2$ and/or $Y_2O_3$, in the melt. A coarse-grained solidification structure is produced in the welded seam. The strengthening effect of the dispersoids in the welded seam is consequently negated. The load-bearing capacity and service life of a structural element joined together in such a way then falls to the level of structural elements joined from standard alloys. Measures to avoid this disadvantage are already known from the publications JP 5212577 A and EP 0320877 B1. In the case of the methods disclosed therein, a fusion-welded seam on ODS sheets is subsequently covered with a Pt-ODS sheet and pressed into the seam by hammering at high temperatures. This measure brings about an increase in the fineness of the grain size distribution on the surface of the welded seam through the sheet and consequently a reduction in the probability of crack formation on the surface. A further possible way of compensating for the decrease in strength in the welded seam has been seen in forming the connection by means of flanged seams. However, these require undesired thickenings of the material in the joining region, which have the consequence when these components are heated in the direct current flow—for example for the purpose of heating the glass melts passed through structural elements joined in such a way—of producing differences in temperature at the seam, which in glass production may in turn lead to considerable glass defects. Furthermore, satisfactory beading of these thickened welded seams is possible only to a restricted extent. Alternatively, therefore, recourse is made to integral connections formed by means of hammer-welded seams. However, connections of this type are subject to very great variations in quality. To eliminate these variations, an extremely great expenditure is required for the preparation of the welded seam and very exact control of the process parameters during the welding. In the case of this method, uniform heating of the materials to be joined, in particular metal sheets, during hammering proves to be difficult. When doing so, it is often scarcely possible to heat the lower sheet in the welding position adequately with the torch to achieve a good adhesive effect during the hammering. The method is consequently very laborious, does not necessarily lead to an optimum result and is very cost-intensive. Furthermore, there is a fundamental problem when fabricating hammer-welded seams, in that there is a low adhesive tendency of the material during the hammering in the case of alloys with a rhodium content >4% by weight and in general in the case of ODS alloys. The oxides already contained in the ODS material or the oxides forming during the hammering, mainly rhodium oxide, significantly reduce the adhesive bonding of the two components, in particular metal sheets. The poor adhesive bonding has the effect of increasing the production expenditure considerably, but also at the same time of increasing the risk of no adequate bond being achieved any longer in certain regions of the joining region in the seam.

As a further possible way of producing welded connections of oxide-dispersion-strengthened alloys with high strength, welding with alloying additions containing zirconium and/or yttrium was considered. These alloying constituents should be separated during use at temperatures above 1200° C. by internal oxidation of the dispersoids in the material and consequently a strengthening effect achieved in the welded seam. In practice, however, it has been found that this method produces only inadequate results, since, during the separation of the dispersoids, the increase in the grain size also occurs at the same time. Consequently, a coarse-grained microstructure in which only a few dispersoids are separated, and the mechanical properties of which are therefore inadequate, often forms very quickly. Such a method for producing pipes from ODS noble metals is described in DE 197 14 365 A1. In the case of this method, as well as the heat treatment, additional rolling is required, whereby the working becomes very protracted and laborious.

SUMMARY OF THE INVENTION

The invention is therefore based on the object of providing a method for welding oxide-dispersed (ODS) metallic materials for producing a connection of components of oxide-dispersion-strengthened alloys which satisfies the increased requirements of structural elements formed from them during use for glass production, i.e. for providing a connection which is distinguished by high strength and thermal load-bearing capacity and under high temperatures does not lead to undesired changes in microstructure, which have an adverse influence on the glass melts flowing around or through these structural elements, which results in glass defects.

For the terms used hereafter for explanation, the following definitions are taken as a basis:

joining region the region between two materials or components which is characterized by the integral connection overlapping region the region which is characterized by the contact or lying one on top of the other of the materials or components to be connected to one another or in the case where there is no direct contact of the desired arrangement of the latter with integral connection in relation to one another during positioning for the welding operation joints surface-area segments or regions of the surface areas facing one another and lying against one another for the welding operation on positioned oxide-dispersion-strengthened components which are connected to one another by means of the integral bond heat-affected zone region in which the microstructure of the materials or components to be connected to one another is influenced and changed when heat is supplied advancing direction direction of the movement of the welding device or of the positioned materials or components.

According to the invention, during the method for producing permanent integral connections of components of oxide-dispersed (ODS) metallic materials, the welding of the individual materials is respectively performed below their melting temperature, with at least partial formation of a diffusion bond in the joining region. In a second method step, the diffusion bond, preferably the entire joining region, is heated to a temperature which likewise lies below the melting temperature of the materials or components to be connected to one another and, at this temperature, is mechanically recompacted, preferably hammered. Depending on the arrangement in relation to one another before the welding operation, the two materials to be connected to one another in this case define the joints, the latter generally also defining the joining region, i.e. the region in which the desired connection between the two is to be produced. According to the invention, consequently a permanent integral connection of components of oxide-dispersed (ODS) metallic materials is provided by arranging for the production of a diffusion-welded bond to be performed before the mechanical recompaction under heat. The diffusion bond permits good heat introduction into the two components to be connected to one another, so that a very high residual strength remains in the joining zone after the subsequent mechanical recompaction, and consequently a material bond which can be subjected to high loading is obtained in this region. As a result of the shaping of the bond by the subsequent mechanical recompaction, there is no abrupt transition between the two materials but a continuous transition. This continuous transition is characterized by very good thermomechanical properties, which make it possible for such connections of oxide-dispersed metallic materials also to be used at very high temperatures, for example at > or =1400° C.

For producing the diffusion bond, the melting temperature of the material which has the lower value is set as the limiting temperature. According to a particularly advantageous refinement, in this case a melting temperature in the range including 0.6 to 0.9 times, preferably 0.7 to 0.9 times, the amount of the melting temperature is chosen. As a result, only little melting is achieved. The diffusion bond is thereby produced during the diffusion welding by matching forming of the joining faces and diffusion of the atoms via the abutting faces of the components or materials to be connected to one another in the joining region. According to a particularly advantageous refinement, this process takes place while a constant pressure is being applied in the joining region, in order to press together the components which are to be connected, although without any plastic deformation, or only very little plastic deformation, in the single-digit percentage range.

The following welding methods are used here, notable for reduced energy input, which keeps down as much as possible the melting of the components or materials to be connected to one another:

1. fusion-welding method
2. pressure-welding method

In the first-mentioned case, the fusion-welding method, the joints of the materials to be connected and, if appropriate, when using an addition of the same type, said addition are transformed partially into the molten state by heat being supplied, as a result of the reduced energy input. This means that the materials to be connected to one another are not completely melted during welding and a diffusion bond is at least partially produced in the joining region. The complete connection in the joining region then takes place by the subsequent working operation of mechanical recompaction under heat, generally hammering. A combination of a fusion-welding method in the form of what is known as the tungsten-inert-gas welding method (TIG welding) and a hammer-welded seam has been determined as particularly advantageous for improving the thermomechanical strength in the joining zone. In this case, a significantly reduced energy input is used during the TIG welding, the two materials or components which are to be welded not melting completely during welding. The two materials are then completely welded to one another in the joining region by the subsequent hot hammering, good heat introduction into the two components to be connected to one another being achieved through the welded seam. Since the melting zone of the TIG seam is only about 15% to 25% of the thickness of one component and the melting zone is deformed considerably during the hammering, a very high residual strength remains in the joining zone.

In the case of the pressure-welding method, the joints of the materials which are to be connected are locally brought into a kneadable state by heat being supplied and are plastically unified by pressure. The heat is usually generated by electrical energy, in particular resistance heating. Other forms of energy are possible. If a lower energy input is used here, too, complete melting does not take place. The actual welding is then performed by the pressure being applied, which leads to plastic unification.

Characteristic method parameters for producing the diffusion bond are in this case the welding temperature, the contact pressure and the welding time, which is characterized by the time period of local exposure to temperature and pressure in the joining region. Since the mass transfer just by diffusion generally requires pure, oxide-free surfaces, work is preferably carried out in a vacuum and inert-gas atmosphere.

The mechanical recompaction is performed at temperatures which likewise lie below the melting temperature of the components to be connected to one another of oxide-dispersed (ODS) metallic materials, by impact loading, preferably constant exposure to impact, of the diffusion bond, in particular by hammering. The energy input takes place for example directly by electrical current flow. Other possibilities are conceivable. On account of the overlapping, the effect does not take place directly but onto the diffusion bond via the components. The hammering may in this case be performed on one side or else on both sides. In the first-mentioned case, the impact loading is exerted on the component in the joining region, while the other, second component is supported against a fixed stop, which produces a counterforce to the force applied by the impact loading. In the other case, the exposure to impact takes place simultaneously on both sides.

With the solution according to the invention, it is possible to provide an integral connection between oxide-dispersed metallic materials which is characterized in the joining region by high strength and good thermomechanical properties and in this respect does not differ from the components to be connected. There is no material weakness to be found in the joining region, with the result that crack formations can be virtually ruled out here. Furthermore, this type of connection produces a transition between the two components to be connected for which no joining zone is evident in the metallographic transverse section.

With respect to the arrangement and types of joint, there are a number of possibilities:

lap joint, i.e. the parts overlap one another parallel joint, i.e. the parts lie against one another over a broad surface area The materials are in this case preferably arranged for joining such that they overlap in such a way that they have an overlapping region which corresponds to three to six times the sheet thickness. The contact areas in the overlapping region may be planar or else formed in a beveled manner. This arrangement is possible both for the fusion-welded variant and the pressure-welded variant for achieving the diffusion bond.

With the solution according to the invention, material bonds of oxide-dispersed (ODS) metallic materials or between components of these materials can be produced in any desired number n, preferably from two or three components. They are then arranged overlapping one another in the joining region. In a perpendicular sectional plane through the overlapping region, the number of parallel joining regions between which there are in each case two components contacting one another is then equal to (n−1).

The production of the diffusion bond by pressure welding furthermore preferably comprises that the oxide-dispersion-strengthened noble-metal alloy components are arranged and positioned overlapping one another in the joining region to form an overlapping region and the joints of the oxide-dispersion-strengthened noble-metal alloy components produced by the overlapping arrangement are locally brought into the flowable state one after the other progressively in the advancing direction of the welding device or of the components to be connected to one another by heat being uniformly supplied on both sides of the overlapping region in the heat-affected zone and plastically unified under pressure. The distance between two neighboring welding points produced when the individual joints are connected is less, considered in the advancing direction, than the dimension of a welding point in this direction. Consequently, the connection by means of a pressure-welding method takes place over a continuous welded seam, whereby very homogeneous microstructures can be achieved in the region of the heat-affected zone. The connection produced in this way is then characterized by high service lives.

The additional optimum matching of the process parameters to one another—rate of advancement of the components or of the welding device, contact pressure and heat supplied—allows the melting to be controlled in such a way that it occurs only at the areas of contact, i.e. the joints, between the two components. Complete melting of the welded-seam region can consequently be avoided. A small depth of the melting zone in this case advantageously does not bring about any change in the fine-grained microstructure in the heat-affected zone of the oxide-dispersion-strengthened noble-metal alloy components.

With a very high chosen density of the welding points, considered in the advancing direction, a seam with a virtually uniform seam thickness can be achieved over the extent in the advancing direction. Such connections are then particularly suitable for the fabrication of structural elements encased in noble metal from a number of individual semi-finished products of oxide-dispersion-strengthened noble-metal alloys, the geometry of which is determined by the connection of these components and which can be integrated into processing processes as a tool or guiding means which expose the structural element to high thermal and mechanical loads with at the same time the required homogeneous behavior of the structural element—including the material connection. Such structural elements are used for example in glass production for the purpose of influencing, in particular homogenizing and guiding, glass melts as stirrers, channels or feeder heads.

Straight-line spot welding or seam-welding methods are preferably used as the pressure-welding method, the arrangement of the seam connections, considered in the advancing direction, taking place in one row or two rows, i.e., when the components take the form of metal sheets, one seam or two parallel seams are arranged in the advancing direction. Such material bonds are distinguished by increased strength.

The supply of heat can be ensured in this case by means of different forms of energy. Electrical energy or ultrasound are preferably used. According to a particularly advantageous refinement of the method according to the invention, a resistance welding method is used as the welding method, in which the required heat of fusion is induced by means of at least one welding electrode which can be connected to at least one power source, is arranged on both sides of the overlapping region and acts on the respective component, during the brief action of a current on the welding electrode as a result of the high transition resistance at the component. The required contact pressure is in this case produced by means of the electrodes. The melting depth on the oxide-dispersion-strengthened noble-metal alloy components is in this method controllable as a function of the current intensity and/or the rate of advancement and/or the contact pressure.

Preferably, a roller seam-welding method is used as the resistance welding method, welding electrodes lying opposite one another in the form of rolling electrodes being arranged on both sides of the overlapping region. These rolling electrodes are rotatably mounted and at least one of the two can be driven, so that the rolling movement can be used for advancing the components. The rolling electrodes simultaneously also exert the pressure on the components. According to a particularly advantageous refinement, they may also be beveled. The bevel then has a width which corresponds to 3 to 7 times the amount of the thickness of the components. With this solution, very high welding seam densities can be achieved with minimal expenditure, reflected in a seam with a uniform seam thickness over the entire region of the extent of the seam in the advancing direction. For changing the contact pressure, the rolling electrodes are mounted displaceably with respect to the components.

According to an advantageous configuration, the electrodes are cooled, preferably water-cooled.

To achieve material bonds of a number of components with a wall thickness which is as uniform as possible, i.e. equal wall thicknesses in the joining region and outside, according to a particularly advantageous further development the oxide-dispersion-strengthened noble-metal alloy components are respectively beveled in the joining region and the components are arranged overlapping such that they lie against one another at the beveled faces produced in this way. As a result, the components can be arranged in one plane, the wall thickness of the material bonds produced from the two components by welding at the welded seam or in the direct vicinity of the welded seam being retained with respect to the wall thickness of the individual component. The mechanical recompaction then also does not lead to thickening in the joining region. Such connections are then particularly suitable for joining together components to form structural elements which are used in processes for which, for example, a uniform heat transmission behavior over the entire extent of the material bond is of special significance.

To achieve an overlapping region which is as large as possible, the length of the beveled faces, considered in cross section through a component, is a multiple of the thickness of the component, in particular at least 2 to 5 times.

To avoid displacement or slipping of the components placed one on top of the other in the welding position under the influence of the contact pressure in the case of beveled components, according to an advantageous further development the beveled faces are provided in the joining region, preferably in the entire overlapping region, with an increased surface roughness. This may be characterized for example by at least one of the parameters stated below:

ten-point height $R_z$ (according to ISO=arithmetic mean of the absolute amounts of the five respectively greatest profile peak heights and profile valley heights)

arithmetic mean roughness value $R_a$ (arithmetic mean value of the absolute amounts of the profile deviations within the roughness reference zone)

maximum profile valley depth $R_m$ (distance of the deepest profile from the center line)

maximum profile height $R_y=R_t$ (distance between the line of the profile cusps and the profile valleys $R_y=R_p+R_m$)

maximum profile cusp height $R_p$ (distance of the highest point of the profile from the center line within the reference zone)

/averaged roughness depth $R_z$/(mean value of the roughness coefficient of five reference zones within an evaluation length)

The averaged roughness depth of the roughened regions of the surface area is 10 to 100 times the averaged roughness depth of the components to be connected to one another.

Typical roughened surfaces have a roughness of between $R_z \sim 40$ mm and $R_z \sim 120$ mm, inclusive.

The required roughness may in this case already take place when beveling by separating with defined cutting or else by later surface working by separating with undefined cutting, for example grinding. According to a particularly advantageous configuration, the components are specifically roughened in the beveled region by means of an embossing roller. The roughening reliably prevents the components from sliding apart, which leads to greater accuracy of the geometry of the welded seam and consequently of the material bond or the structural element produced. Furthermore, the welded seams produced are characterized by a greater load-bearing capacity than welded seams on smooth surface areas, since the roughening makes it possible to keep better control over the welding parameters, since the contact area that is decisive for the current transfer by the pressing of the roughened regions into one another is made more uniform by the selective roughening.

A further major advantage of a material bond produced according to the invention with joining faces beveled in the joining region is that the overall welded material bond can also be subjected to further working steps, in which for example beads which run perpendicularly to the welded seam can be formed both into the components and in the joining region.

According to a particularly advantageous further development of the solution according to the invention, irrespective of the chosen method for producing the diffusion bond, it is envisaged to use a welding filler. This is arranged in the joining region between the two materials or components of oxide-dispersed metallic materials which are to be joined to one another. The welding filler may in this case take the form of a separate element or else a coating on at least one of the mutually facing joining areas in the joining region. Ductile fusion-alloyed alloys, for example PtAu5, PtIr1, pure Pt, but also stronger alloys, for example PtRh5, PtRh10, PtIr3, are suitable in particular here as welding fillers.

The welding filler allows a much better bond to be achieved between the two materials to be connected to one another, since the adhesive tendency between the two materials is significantly increased, which considerably reduces the fabrication expenditure. Furthermore, the thermal and mechanical load-bearing capacity of the joining zones is considerably increased. The effect is based on the fact that the superficially formed oxides in the overlapping zones are pressed into the ductile material of the welding filler, whereby a solid bond is obtained between the two materials.

Preferably, since it can be realized with little expenditure, at least one noble metal foil is inserted between the materials to be connected to one another. Said foil is preferably characterized by a thickness of 20 mm to 200 mm, inclusive. Typically, the thickness of the noble metal foil is 30 mm to 150 mm, in exceptional cases up to 250 mm. The subsequent hammering at high temperatures then allows the two materials to be joined together very easily. Micrographs through the hammered joining zone show that a welded seam in which the original foil makes up less than 30 mm of the thickness is formed. The diffusion processes during the actual welding have the effect that a material bond which can withstand great loading is then produced in this region. Instead of rolled platinum foils, gold leaf may also be used.

The foils themselves may consist entirely of the alloys mentioned or else merely be provided with a correspondingly thick coating of them, the contact with the components to be connected taking place via the coating. Furthermore, there is the possibility of using not just a single foil but a foil laminate, i.e. the n+1 foils can be connected to one another, with $n \geq 1$.

According to an alternative configuration, instead of the insertion of a foil, the respective contact zone of the materials to be connected to one another may also be coated in a foil-welding manner in the overlapping region with a thin noble metal layer, in analogy with the foil, for example by platinum alloys. This coating may for example be electrodeposited or else applied by currentless deposition. Also conceivable is a coating by means of a thermal spraying operation. In this case, layers with a thickness of 30 mm to 80 mm, inclusive, are preferably applied.

The production of hammer-welded seams by mechanical recompaction by hammering with foils as an intermediate layer is particularly simple if a pressure-welding method in the form of a roller seam-welding method, as already described, is additionally used for producing the diffusion bond. In this case, the foil is inserted between the two components or the materials to be connected to one another. The two components are firmly connected to one another by means of the roller seam welding. The decisive advantage is that no impurity in the form of oxides can get between the foil and the components. Impurities in the form of oxides always mean that the welded seam is weakened and can lead to failure of the seam under loading. Only in the subsequent working step is the joint then hot-hammered. A further additional improvement in the roller seam welding can be further achieved by the use of tungsten electrodes and molybdenum electrodes. This is so because sticking of the electrodes to the noble metal sheets to be welded is very often encountered when electrodes made of copper or its alloys are used, greatly restricting the choice of welding parameters. With the preferred electrode material, the welding parameters, in particular the current intensity and contact pressure, can be varied over a very wide range, with the result that no melting is achieved at the contact locations between the materials to be joined to one another during the welding, but an adequate bond can nevertheless be achieved. This bond is a pure diffusion bond. The lower tendency to stick in the case of molybdenum or tungsten is caused by the formation of volatile oxides which evaporate during the welding at high temperatures.

One particular advantage in the case of the method for roller seam welding is, furthermore, that even metal sheets or foils with a very low wall thickness can be welded to one another. Following this, only very little hammering is necessary. The method described is consequently preferably able to be used for welding relatively thin sheets, in particular of thicknesses of 50 mm to about 5 mm, inclusive, in exceptional cases even greater.

A further advantage is that ODS alloys based on PtRh10 can be joined directly to melt-metallurgically produced standard alloys (Pt—Rh, Pt—Au and Pt—Ir). As a result of the shaping of the seam during forging, there is no abrupt transition between the two materials, but rather a continuous transition takes place. This continuous material transition in turn has advantages with regard to the thermomechanical properties.

In the production of the welded seam generally with a method according to the invention and corresponding positioning of the welding device, the components can be characterized with regard to their position by the following welding position:

combined gravity and overhead position, i.e. the components are aligned in a horizontal plane and the supply of heat required for the welding method and the pressure required for the plastic deformation take place perpendicularly, i.e. in the vertical direction in relation to the structural elements to be joined, both from above and from below combined horizontal and half-overhead position, i.e. the components to be joined are aligned at an angle to the horizontal, the welding device correspondingly perpendicular to the latter horizontal-vertical position, i.e. the structural elements to be joined are arranged in the vertical direction and the supply of heat required for the welding method and the pressure required for the plastic deformation take place perpendicularly, i.e. in the horizontal direction onto the structural elements to be joined.

With respect to the application of the method according to the invention, there are no restrictions on the configuration of the individual components. In the case of the oxide-dispersion-strengthened noble-metal alloy components, they may be both planar and shaped sheet metal elements or hollow bodies, such as pipes for example.

With the method according to the invention, oxide-dispersion-strengthened noble-metal alloys which contain zirconium oxide and/or yttrium oxide as a fine-grained stabilizer can be welded well. The method is advantageously suitable furthermore for the welding of oxide-dispersion-strengthened platinum base alloys, i.e. pure platinum, platinum-rhodium, platinum-gold and platinum-iridium. In this case, materials of the same composition but also components of different materials can be welded to one another.

Further according to the invention, n oxide-dispersion-strengthened materials can be connected at a number of the joining regions which are parallel in a perpendicular sectional plane through the overlapping regions and between two of the components by setting the number of joining regions to be equal to n−1.

Other features and advantages of the present invention will become apparent from the following description of the invention which refers to the accompanying drawings.

BRIEF DESCRIPTION OF THE DRAWINGS

Other objects and features of the invention are explained below on the basis of Figures, in which specifically:

FIGS. 2a and 2b show on the basis of two sectional representations according to FIGS. 1a and 1b the method for producing a diffusion bond with components arranged in two planes;

FIG. 3a illustrates in a schematically simplified representation a further possible way of achieving a diffusion bond by means of a modified fusion-welding method;

FIG. 3b illustrates in a schematically simplified representation the combination of a welding method according to FIG. 3a with downstream or subsequent mechanical compaction at an elevated temperature on the basis of the connection of two oxide-dispersed (ODS) metallic materials;

FIG. 4a illustrates a metallographic transverse section through an integral connection by roller seam welding and subsequent recompaction, without a welding filler;

FIG. 4b illustrates a metallographic transverse section through an integral connection by means of roller seam welding and hammer welding with a welding filler in the form of a noble metal foil.

PREFERRED EMBODIMENTS OF THE INVENTION

Figure 1A:
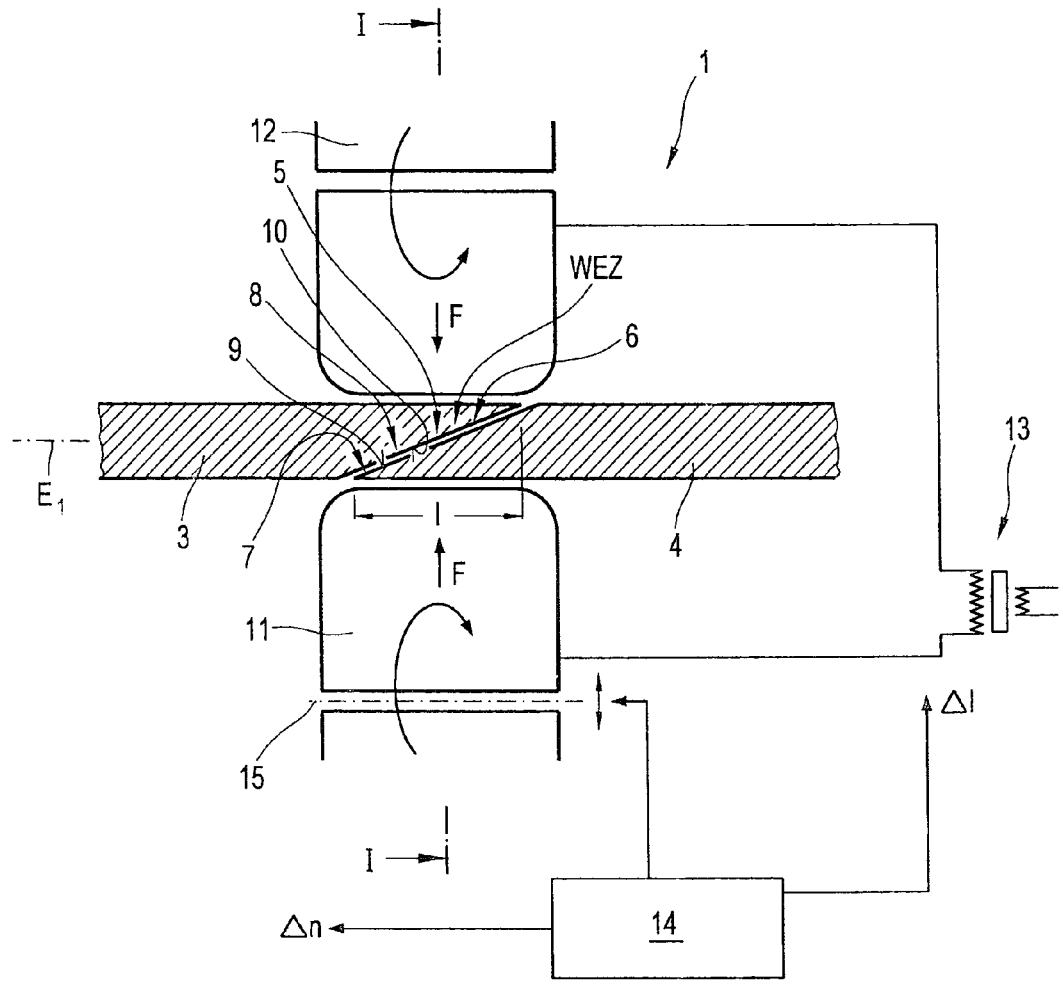
FIGS. 1a and 1b illustrate on the basis of two sectional representations through a welding device in a schematically greatly simplified representation the basic principle of a particularly advantageous embodiment of the first method step for producing a diffusion bond of the method according to the invention by a roller seam-welding method, the components to be connected to one another being beveled in the joining region.
Figure 1B:
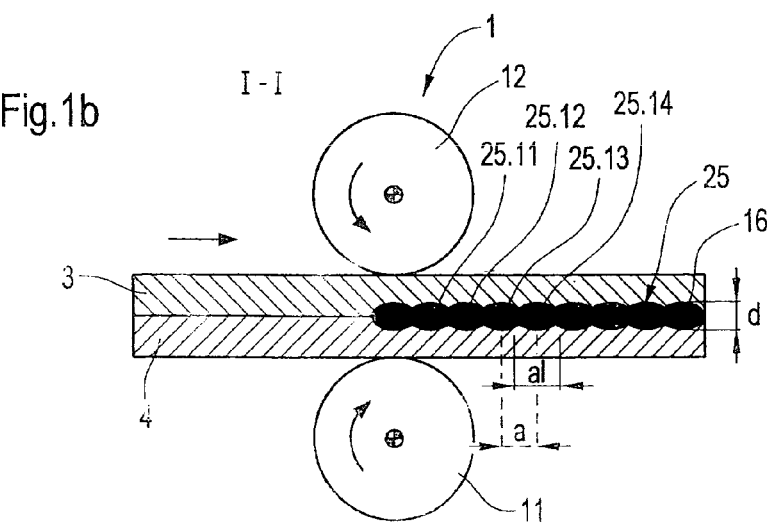

FIGS. 1a and 1b illustrate in a schematically simplified representation on the basis of two sectional representations through a welding device 1 the basic principle of the first method step of the method according to the invention for realizing an integral connection 2 which can be subjected to thermal and mechanical loading of two components 3 and 4, in particular two oxide-dispersed (ODS) metallic materials or of two components of oxide-dispersion-strengthened noble-metal alloys, the production of a diffusion bond 25, focusing here on a particularly advantageous embodiment of the method step for producing the diffusion bond 25. FIG. 1a thereby illustrates a sectional view in the advancing direction of the two components 3 and 4 through the latter, FIG. 1b illustrates a sectional view transversely to the advancing direction.

The arrangement of the two components 3 and 4 to be welded in the welding position takes place according to a particularly advantageous embodiment in a common plane E1, the two components 3 and 4 being arranged such that they overlap in the joining region 5. Joining region 5 is understood here as meaning the region which is characterized by the direct integral connection of the two components 3 and 4. The axial extent I of the overlap defines an overlapping region 6. In this case, the two components 3 and 4 have in a particularly advantageous way, at least in the overlapping region 6, in each case a bevel 7 and 8, which in the welding position of the two components 3 and 4 is aligned in such a way that the beveled faces 9 of the bevel 7 and 10 of the bevel 8, face one another and lie against one another. To avoid slipping of the components 3 and 4 in the welding position with respect to one another, at least the surface-area regions of the beveled faces 9 and 10 which are integrally connected to one another under the effect of heat and force are provided with an increased surface roughness, preferably the entire beveled faces 9 and 10. The surface roughness may in this case be characterized for example by the mean surface roughness or some other characteristic roughness value. The desired roughening of the surface may already be produced by the fabrication, i.e. when the bevel is produced, or else by subsequent surface working of the beveled face. The actual selection is at the discretion of the relevant person skilled in the art.

The chosen method in the case represented is a resistance welding method, preferably a resistance roller seam-welding method, in which the joints obtained by the overlapping arrangement of the oxide-dispersion-strengthened noble-metal alloy components 3 and 4 are locally brought into the kneadable state one after the other progressively in the advancing direction of the components 3 and 4 to be connected to one another by heat being uniformly supplied on both sides of the overlapping region 6 in the heat-affected zone WEZ and plastically unified under pressure, preferably constant pressure, the distance between two neighboring welding points produced when the individual joints are connected being less, considered in the advancing direction, than the dimension of a welding point in this direction. According to the invention, the heating in the heat-affected zone is only performed, however, to a temperature which lies below the melting temperature of the components 3 and 4 to be welded, to one another, preferably corresponds to 0.7 to 0.9 times the amount of the melting temperature of the component with the lower melting temperature. The welding device 1 comprises for this purpose at least two welding electrodes 11 and 12, which are assigned the two components 3 and 4 in the overlapping region 6, opposite one another, respectively act on a component 3 or 4, can be supplied with power via an energy source 13 and in the case represented are rolling electrode. Both are rotatably mounted and preferably at least one of the two can be driven. The required heat of fusion is induced during the brief action of a current on the welding electrode 11 and 12 us a result of the high transition resistance at the component 4 and 3. The required contact pressure is in this case produced by means of the electrodes 11 and 12. When configured as rolling electrodes, they serve for transporting the components 3 and 4 in the advancing direction. The melting depth on the oxide-dispersion-strengthened noble-metal alloy components 3 and 4, in particular at the beveled faces 9 and 10 coming into contact with one another, is in this method controllable as a function of the current intensity and/or the rate of advancement and/or the contact pressure p. There maybe provided for this purpose a control device 14, which is represented here only very schematically and in each case is coupled to the actuating devices for influencing these parameters. The contact pressure p is realized by variation of the pressing force F, for example by means of the displaceability of the welding electrodes 11 and 12 with respect to the components to be connected to one another, illustrated here by a double-headed arrow at the mounting 15 of the welding electrode 11. The rate of advancement can be influenced by changing the rotational speed $\Delta n$ of the rolling electrodes 11 and 12. Furthermore, the current intensity can be changed by $\Delta I$. According to the invention, the energy input takes place via the welding electrodes 11 and 12 in such a way that complete melting does not take place, but rather a connection by diffusion is realized. A material which does not react with the components 3 and 4 to be joined is preferably chosen as the electrode material for the welding electrodes 11 and 12. Therefore, electrodes made of molybdenum, tungsten or their alloys are preferably used.

In the sectional representation I—I according to FIG. 1b, it is evident that the distance a between two neighboring welding points, here for example 25,11, 25,12, 25.13 and 25.14, produced when the individual joints are connected is less, considered in the advancing direction, than the dimensional of a welding point 25.13 in this direction. With a very high welding point density, and consequently seam density, the integral connection 25 can be produced in the form of a seam 16 with virtually uniform seam thickness d over the extent in the advancing direction.

In the case of the configuration represented in FIGS. 1a and 1b, the seam is for example of a single row.

Figure 1C:
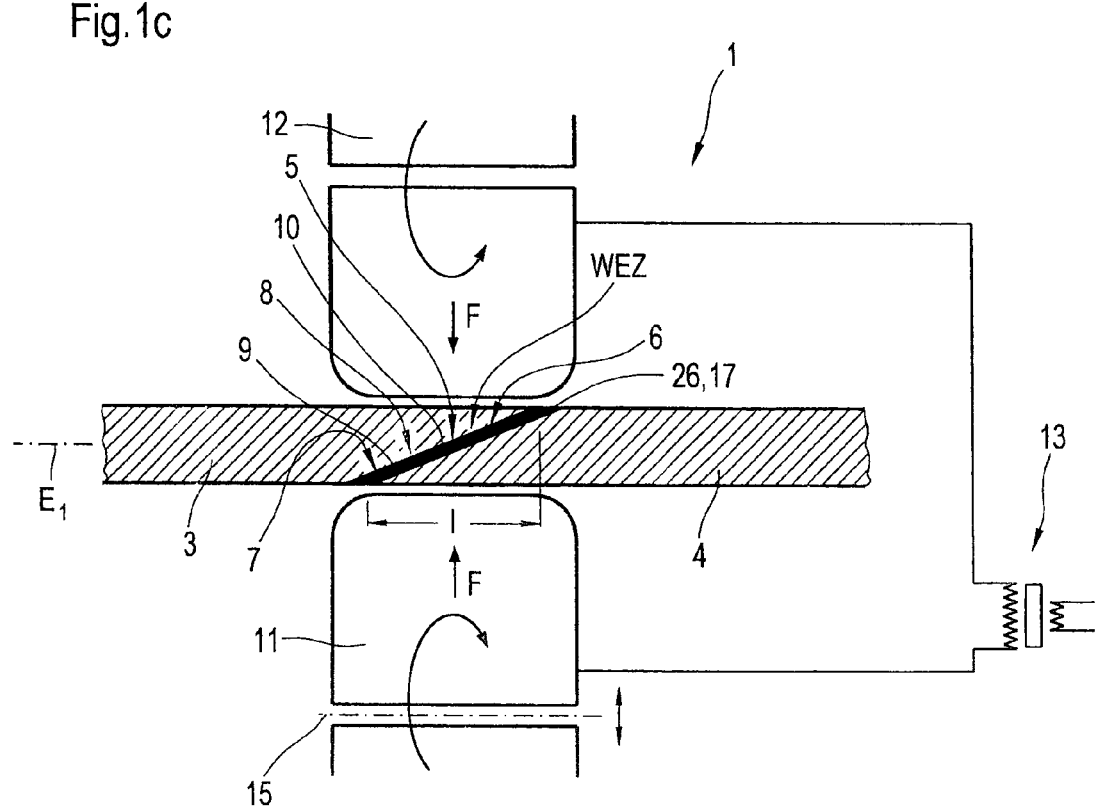
FIG. 1c illustrates a further development according to FIGS. 1a and 1b with a noble metal foil inserted between in the joining region of the two structural elements to be connected to one another.

FIG. 1c illustrates a further development according to FIG. 1a, in which a welding filler 26 in the form of a noble metal foil 17 is provided in the overlapping region 6 between the beveled faces 9 and 10. The thickness of the foil 17 is preferably 30 mm to 150 mm, inclusive. Suitable in particular as this foil are ductile fusion-alloyed alloys, for example PtAu5, PtIr1, pure Pt, but also stronger alloys, for example PtRh5, PtRh10, PtIr3. The advantage is that, during the roller seam welding operation, no impurities can get between the foil 17 and the components 3 and 4.

The foil 17 is dimensioned in such a way that it preferably extends over the entire joining region 5 both in the advancing direction and transversely to the advancing direction, it being characterized by at least a subregion, preferably the entire region of the overlapping region 6.

Figure 1D:
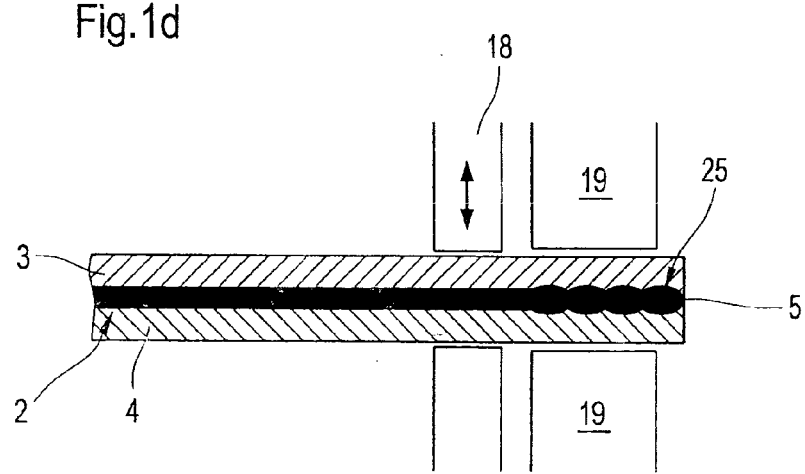
FIG. 1d illustrates in a schematically greatly simplified representation the basic principle of the second method step in the form of the mechanical recompaction of the diffusion bond according to FIGS. 1a–1c by hammering.

Reproduced in the schematically simplified representation in FIG. 1d is the basic principle of the second method step, the mechanical recompaction at higher temperature for a diffusion bond 25 according to FIGS. 1a to 1c, resulting in the integral connection 2. Provided in this respect is a device 18, which applies local impact loading to the diffusion bond 25 in the joining region 5 and, furthermore, a device 19, which heats the joining region to a very high temperature, which however is likewise below the melting temperature of the materials or components 3 and 4 of oxide-dispersed metallic materials to be connected to one another. This may take place directly after the roller seam-welding method, i.e. in a common device, the expenditure in terms of the device in this case being very high and can be realized only by means of special devices. This means that the components 3 and 4 to be connected to one another are then fed in the advancing direction to the device 19 and the device 18. The device 19 and the device 18 may in this case likewise be spatially combined or else arranged one behind the other. Preferably, however, the second method step of mechanical recompaction is performed at a separate place and at a separate time than the first. In this case, the components 3 and 4 are first connected by means of the roller seam-welding method in the welding device 1. After passing the welding device 1, the diffusion bonds 25 produced in this way can firstly be buffer-stored and are then subjected in a further, second method step, i.e. after a time interval with respect to the welding operation, to the mechanical finishing, in particular recompaction. The choice of the procedure is then at the discretion of the relevant person skilled in the art.

The heating for the purpose of recompaction is preferably performed by direct current flow. The device 19 is then to be designed in this respect. The recompaction may in this case be performed on one side, as represented. In this case, the device 18 comprises a first subdevice, which is mounted movably with respect to the components 3 and 4 connected by means of diffusion bond 25, and applies a thrust or impact loading to the latter. As this happens, the second subdevice supports the components 3 and 4. It is, however, also conceivable to achieve the mechanical recompaction by applying impact loading on both sides of the diffusion bond 25.

FIGS. 2a and 2b illustrate a simplified configuration of the method according to the invention for the pressure welding of oxide-dispersion-strengthened noble-metal alloy components 3.2 and 4.2 according to FIGS. 1a and 1b, dispensing with an arrangement of the components 3.2 and 4.2 in one plane E1. The components 3.2 and 4.2 are arranged overlapping one another in two planes E1 and E2, i.e. dispensing with the respective bevels 7 and 8. The overlapping of the two in this case determines the overlapping region 6.2. The basic setup of the welding device 1.2 corresponds to that described in FIG. 1a, for which reason the same designations awe used for the same elements. With respect to the operating principle of the welding device 1.2, reference can be made to the description relating to FIG. 1a. FIG. 2b illustrates a sectional representation II—II according to FIG. 2a. Here, too, it is evident that the distance $a_2$ between two neighboring welding points, here for example 25.21, 25.22, 25.23 and 25.24, produced when the individual joints are connected is less, considered in the advancing direction, than the dimension $a1_2$ of a welding point 25.23 in this direction. With a very high welding point density, and consequently seam density, the diffusion bond 25.2 can be produced in the from of a seam 16.2 with virtually uniform seam thickness d over the extent in the advancing direction.

The seam 16.2 according to FIG. 2 is also of one row. However, with this type of arrangement of the components 3.2 and 4.2, a two-rowed seam configuration is also conceivable. In this case, a second parallel seam 16.22 would be arranged at a distance a16 from the seam 16.2. This second seam is represented here in FIG. 2a by a broken line just to illustrate this possibility, and is preferably produced by means of further welding electrodes, which are not represented here and are arranged parallel to the welding electrodes 11.2 and 12.2.

Figure 2C:
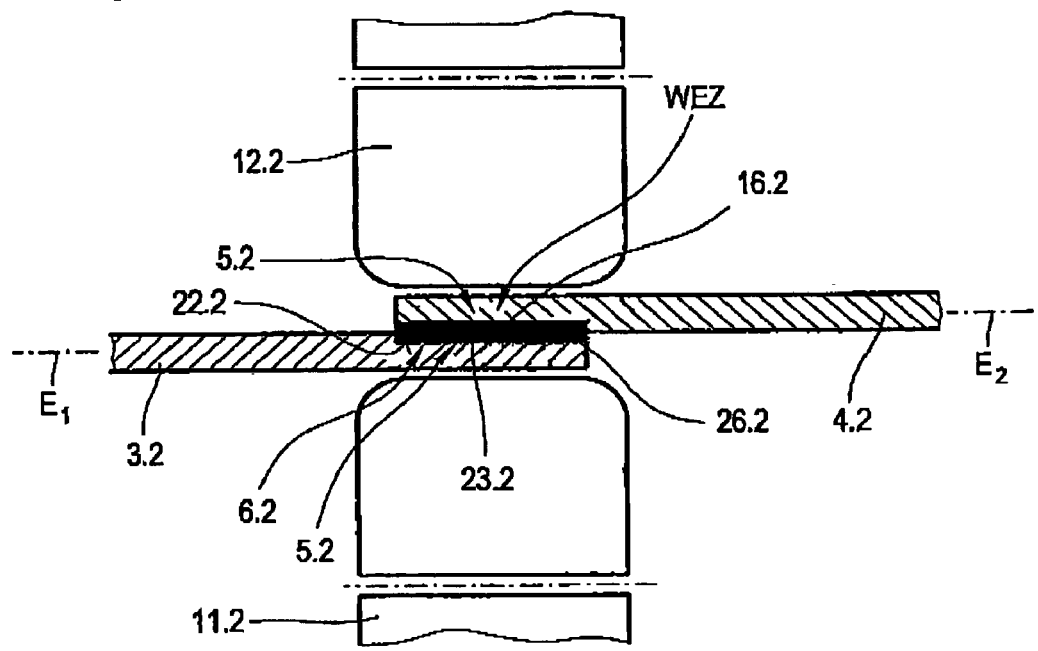
FIG. 2c illustrates on the basis of the configuration according to FIG. 2a the production of a diffusion bond with the aid of a welding filler in the form of a coating in the joining region.

FIG. 2c illustrates a further development according to FIG. 2a, with the provision of a welding filler 26.2 in the joining region 5.2. Said welding filler here comprises at least the coating of a contact area 22.2 or 23.2 in the overlapping region 6.2 of the two components 3.2 and 4.2 to be connected to one another, preferably the two mutually facing contact areas 22.2 and 23.2. The choice of material for the welding filler 26.2 and the basic principle of the mode of operation in this case correspond to that described in FIG. 1c.

While a pressure-welding method was assumed in FIGS. 1a to 1c for realizing a diffusion bond 25, FIG. 3a and 3b illustrate a further possibility by means of a modified fusion-welding method. Both components 3.3 and 4.3 have a bevel and the arrangement of the two components 3.3 and 4.3 takes place in this case one over the other with a broad surface area in the region of the bevels, i.e. both in the advancing direction and transversely to the latter, as represented in FIG. 1a and 1b. In the contact region between the two components 3.3 and 4.3, in particular the contact areas 22.3 and 23.3, the overlapping region 6.3 is formed. A TIG welding device is used in this case as the welding device 1.3. It comprises at least one electrode 21, which is assigned to the overlapping region 6.3 in the joining region 5.3 and permits an energy input between the two contact areas 22.3 and 23.3 in the overlapping region 6.3. The two components 3.3 and 4.3 to be welded to one another are in this case not completely melted during the actual welding operation, but only the upper region 7.3, 8.3. The melting zone of the TIG seam 24 is only about 15 to 25% of the sheet thickness of one of the two components 4.3 or 3.3. Following the production of the TIG seam 24, the latter is mechanically recompacted in a further, second method step by hammering. It is possible here, as represented in FIG. 3b, for this method step to follow on directly after the welding operation, in that the energy input introduced at the same time determines the temperature for the hammering operation.

Here, too, a corresponding device 18.3 is provided for applying local impact loading. This device is arranged downstream of the welding device 1.3 in the advancing direction. In addition, a device 19 (see FIG. 1*d*) for heating the diffusion bond 25.3 formed at TIG seam 24 may be arranged upstream of the device 18.3. Alternatively, a spatial and temporal separation between the two method steps is possible, as described for example in FIG. 1*d*. The end product is in both cases a permanent integral connection 2.3.

FIG. 4*a* illustrates a metallographic transverse section through the welded seam of two PtRh10-ODS sheets welded to one another. In this case, joining was performed in the first method step by means of roller seam welding. The final diffusion bond was obtained by hammering. No welding filler was used. In the region of the former contact areas of the overlapping regions there is scarcely any remaining evident difference in microstructure. This is particularly clear in the middle picture.

FIG. 4*b* illustrates a metallographic transverse section through the welded seam of two PtRh10-ODS metallic components welded to one another. Although joining was performed by means of roller seam welding, the final diffusion bond was subsequently obtained by hammer welding. In this case, a foil of pure platinum was placed as a welding filler between the materials to be connected to one another in the overlapping region or joining region. The coarser grain structure in the foil compared with the fine-grained microstructure of the ODS material is clearly evident.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for producing permanent integral connections of oxide-dispersed metallic materials by welding, comprising:
   supplying two materials or components of the materials to be connected to one another; overlapping the materials or components, one over the other, to form an overlapping region, including a joining region at the overlapping region;
   performing a first welding operation by heating the materials or components at the joining region below the melting temperatures of the materials or the components without compression whereby the materials or components form, at least partially, a diffusion bond; and
   performing a subsequent and temporally delayed second welding operation by heating the diffusion bond to a temperature below the melting temperature of the materials or components to be connected, and by mechanically recompacting the diffusion bond.

2. The method of claim 1, wherein the materials or components to be connected have respective different melting temperatures with one of the materials or components having a higher melting temperature and the other of the materials or components having a lower melting temperature,
   the method further comprising heating the materials to be connected in the joining region to a temperature in a range between 0.6 and 0.9 times the melting temperature of the material having the lower melting temperature.

3. The method of claim 1, wherein the mechanical recompacting of the diffusion bond occurs directly downstream and after the welding which forms, at least partially, a diffusion bond.

4. The method of claim 3, wherein the step of mechanically recompacting the diffusion bond is performed at a temperature corresponding to that of the first welding step.

5. The method of claim 1, wherein the mechanical recompacting is performed at a different time and at a different location than the first welding operation.

6. The method of claim 1, wherein the materials or components to be connected have respective different melting temperatures with one of the materials or components having a higher melting temperature and the other of the materials or components having a lower inciting temperature; and
   the heating of the diffusion bond before the mechanical recompacting is to a temperature in the range of 0.6 to 0.9 times the melting temperature of the material or component having the lower melting temperature.

7. The method of claim 6, wherein the heating of the diffusion bond before the mechanical recompacting is by a direct current flow.

8. The method of claim 1, wherein the mechanical recompacting is performed by applying a constant impact load to the diffusion bond by hammering on the bond.

9. The method of claim 8, wherein the diffusion bond has opposite sides corresponding to opposite sides of the connection being formed, and the recompacting is performed by applying the impact load uniformly on both opposite sides of the diffusion bond.

10. The method of claim 1, wherein the first welding operation is performed without a welding filler.

11. The method of claim 1, further comprising arranging a welding filler between the materials or components to be connected to one another in the joining region before the first welding operation is performed, and performing the first welding operation with the welding filler.

12. The method of claim 11, wherein the welding filler comprises at least one noble metal foil disposed between the materials or components to be connected in the joining region.

13. The method of claim 12, wherein the noble metal foil is a material more ductile than metal sheet.

14. The method of claim 12, wherein the noble metal foil has a thickness in the range of 20 µm to 200 µm.

15. The method of claim 12, further comprising arranging two of the noble metal foils overlapping one another in the joining region.

16. The method of claim 11, wherein the components or materials to be connected in the joining region have respective mutually facing contact areas;
   the method further comprising applying a noble metal coating on the mutually facing contact areas to be connected in the joining region wherein the coating defines a welding filler for the first welding operation.

17. The method of claim 1, wherein the welding filler is an alloy selected from the group consisting. Pt, Pt—Ir, Pt—Au, Pt—Rh, and combinations thereof.

18. The method of claim 1, further comprising arranging the materials or components in the joining region to define a lap joint at the joining region.

19. The method of claim 1, further comprising arranging the materials or components to be connected to one another in the joining region so as to form an overlapping region including a parallel joint between the materials or components.

20. The method of claim 1, wherein the materials or components to be connected to one another each have a bevel in the joining region,
the method further comprising arranging the materials or components so that the bevels overlap before the first welding operation is performed.

21. The method of claim 20, wherein the bevels are defined by beveled faces which overlap in an overlapping region, and
the oxide dispersed metallic materials are arranged in one plane with the beveled faces in contact with each other over their respective entire surface in the overlapping region.

22. The method of claim 20, wherein the materials or components when connected at the joining region have a thickness and have a length of the bevels, and the length of the bevels corresponds to a range of two to five times the thickness of the joined materials or components at the joining region.

23. The method of claim 20, wherein the bevels are defined by respective beveled faces on the materials or components in the joining region, and at least one of the beveled faces in the joining region has an increased surface roughness with respect to other surface areas of the components.

24. The method of claim 23, further comprising providing the beveled faces with greater surface roughness during fabrication of the bevels or during a finishing operation performed on the beveled faces using an embossing roller.

25. The method of claim 20, wherein the bevels are defined by respective beveled faces on the materials or components in the joining region and the entire beveled faces in the joining region having an increased surface roughness with respect to other surface areas of the components.

26. The method of claim 23, wherein the roughened regions of the beveled faces have an average roughness depth of between 40 µm and 120 µm.

27. The method of claim 1, further comprising connecting oxide-dispersion-strengthened materials at a number of the joining regions which are parallel in a perpendicular sectional plane through the overlapping regions and between two of the components by setting the number of joining regions to be equal to n−1.

28. The method of claim 1, wherein the overlapping region provides a plurality of joints of oxide-dispersed metallic material,
the method comprising locally bringing the joints into a flowable state one after the other progressively either in an advancing direction of a welding device for welding or an advancing direction of the materials or components to be welded with respect to a welding device;
the bringing of the materials or components at the joining region into a flowable state comprises uniformly supplying heat at both sides of the material or component at the overlapping region in a heat affected zone for plastically unifying the materials or components under pressure;
the welding being performed such that there are neighboring welding points produced when individual joints are connected, and the distance between two neighboring welding joints produced when individual joints are connected is less than the dimension of a welding point in the advancing direction.

29. The method of claim 28, wherein the welding is performed by a seam-welding method, which produces seam connections, and the welding is performed so that the seam connections are in rows in the advancing direction.

30. The method of claim 28, further comprising welding points along the welding joint and the welding being performed so that neighboring ones of the welding points of the welding device or the materials or components form a seam with either no variations or very small variations in the seam thickness in the advancing direction.

31. The method of claim 1, wherein the first welding operation further comprises heating the materials or components to bring the joints to a flowable state by providing at least one of energy sources selected from the group consisting of electrical energy, ultrasound and induction.

32. The method of claim 31, wherein the first welding operation is performed by inducing at both sides of the materials and components in the joining region a heat of fusion using at least one welding electrode, connected to a source of electric current for a selected time interval, the welding being produced as a result of the high transition resistance at the component.

33. The method of claim 32, further comprising controlling the melting depths on the oxide dispersed metallic materials as a function of at least one of the current intensity, the rate of relative advancement of at least one of the welding electrode and the materials or components being welded with respect to the other one, and contact pressure.

34. The method of claim 32, further comprising using a roller seam-welding method for the resistance welding and using rotatably mounted rolling electrodes as the welding electrodes on both sides at the overlapping region,
the method further comprising driving at least one of the electrodes to rotate and causing the electrodes to exert pressure on the materials or components being welded.

35. The method of claim 34, further comprising mounting and adjusting the rolling electrodes displaceably with respect to the materials and components to be welded for enabling adjustment of the contact pressure.

36. The method of claim 31, further comprising using a TIG welding method modifiable with respect to the energy input to the welding device.

37. The method of claim 1, wherein the materials or components to be welded are of respective different materials.

38. The method of claim 37, wherein the materials or components to be welded consist of an oxide-dispersed material based on Pt-ODS or Pt—Au5-ODS or PtRh10-ODS.

39. The method of claim 1, wherein the materials or components to be welded at least at the joining region comprise materials which are not strengthened, whereby the welding is of purely fusion-alloy materials or components.

40. The method of claim 39, wherein the materials or components consist of materials based on Pt, Pt—Au, Pt—Rh or Pt—Ir.

41. The method of claim 1, wherein the materials or components which are to be welded have different respective thicknesses.

42. The method of claim 1, wherein a combined gravity and overhead position defines the welding position of the materials or components at the joint.

* * * * *